(No Model.)
J. A. KERN.
HARROW.
No. 350,683. Patented Oct. 12, 1886.
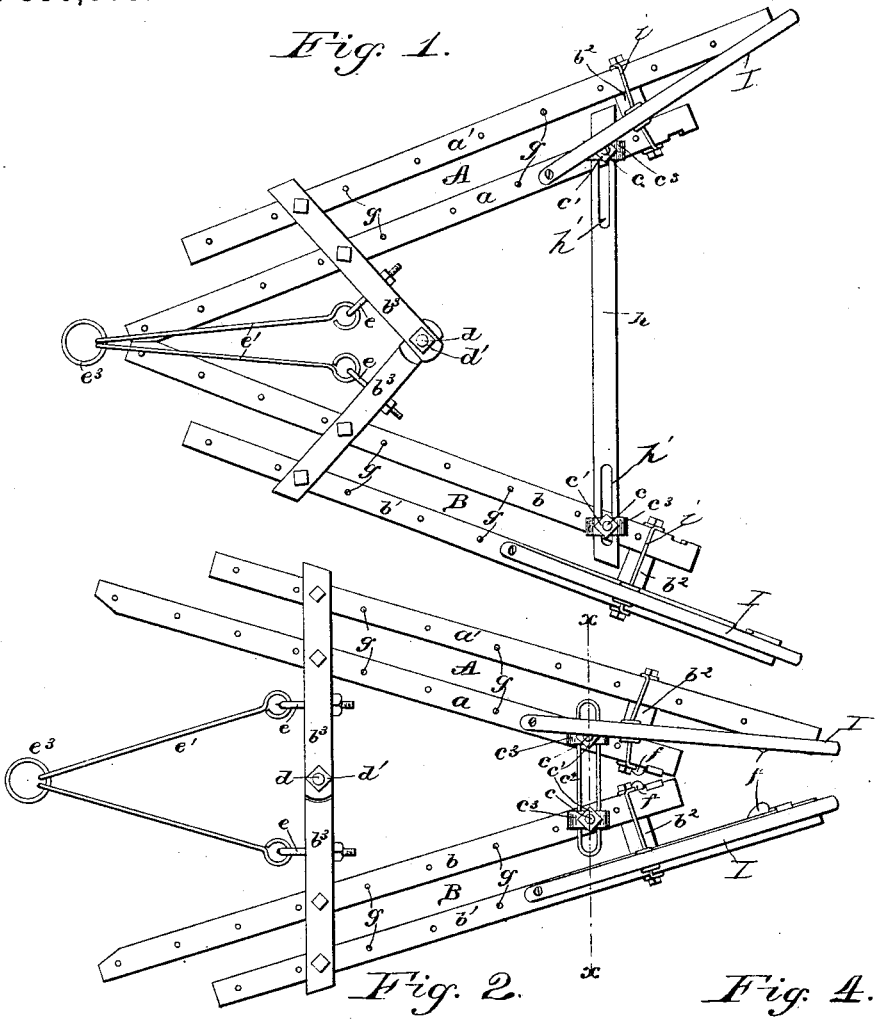
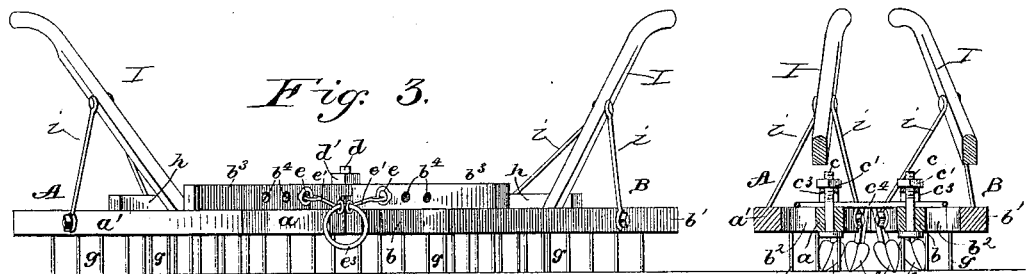
Witnesses
Percy C. Bowen
E. G. Siggers
Inventor,
John A. Kern.
By his Attorneys
C. A. Snow & Co.

United States Patent Office.

JOHN A. KERN, OF QUAKER HILL, INDIANA.

HARROW.

SPECIFICATION forming part of Letters Patent No. 350,683, dated October 12, 1886.

Application filed June 17, 1886. Serial No. 205,468. (No model.)

*To all whom it may concern:*

Be it known that I, JOHN A. KERN, a citizen of the United States, residing at Quaker Hill, in the county of Vermillion and State of Indiana, have invented a new and useful Improvement in Harrows, of which the following is a specification.

My invention relates to improvements in harrows; and it consists of the peculiar combination and novel construction and arrangement of the various parts for service, substantially as hereinafter fully described, and particularly pointed out in the claims.

The primary object of my invention is to provide an improved harrow which can be used as an ordinary smoothing-harrow or adapted for service as a cultivator in working growing corn or other cereals.

A further object of my invention is to provide the harrow when it is adjusted for cultivating crops with means whereby the rear ends are normally forced or closed together by the strain or draft of the animal; to provide improved means for loosely coupling the rear ends of the harrow-sections, so that the attendant can move or adjust the harrow-sections independently of each other toward or from the work, and to improve the harrow in minor details, so that it shall possess superior advantages over others that have preceded it in points of simplicity and durability of construction and cheapness of manufacture.

In the accompanying drawings, which illustrate a harrow embodying my invention, Figure 1 is a top plan view showing it adjusted as a smoothing-harrow. Fig. 2 is a like view of the harrow, showing it adjusted as a cultivator. Fig. 3 is an end view of Fig. 1, and Fig. 4 is a vertical transverse sectional view on the line $x\ x$ of Fig. 2.

Referring to the drawings, in which like letters of reference denote corresponding parts in all the figures, A B designate the sections of my improved harrow, which are coupled together in such manner that either end can be separated and held apart to adapt the device for use as an ordinary smoothing-harrow or as a cultivating implement. Each section of the harrow consists of two bars, which are arranged parallel with each other, the bars of the section A being lettered $a\ a'$, and the bars of section B being lettered $b\ b'$, respectively. These parallel bars are arranged out of contact with and a short distance apart from each other, and at one end the bars are held in their proper positions by interposed blocks $b^2$, that are secured rigidly to the bars, the opposite ends of the bars being held apart by arms or short bars $b^3$, which are secured to the upper sides of the longitudinal parallel bars of the harrow-sections. These arms $b^3$ are arranged transversely across the harrow-sections at right angles thereto, and they extend beyond the inner bars, $a'\ b'$, of said sections, and are jointed or coupled together by a vertical bolt, $d$, having a nut, $d'$. The coupling-arms are thus rigidly secured to the harrow-sections and pivotally connected together, and the arms are arranged in line with or at an angle to each other, as shown in Fig. 2, when the harrow-sections are adjusted as a cultivating implement or a smoothing-harrow, the meeting ends of the coupling-arms moving or turning on the vertical pivot-bolt $d$. The coupling-arms are arranged at the front of the harrow, and they are provided with transverse horizontal openings $b^4$, through which are passed the shanks of draft-eyes $e$, which are detachably connected to the bars, and are adapted to be adjusted or fitted in either of the openings at the outer extremities of the arms, or nearer to the harrow sections, as is obvious. One of these draft-eyes is provided for each of the coupling-bars, and to the said eyes are loosely connected the draft-links $e'$, which converge toward each other, and are connected by a common eye or ring, $e^3$, at a point beyond the outermost extremity of the bars of the harrow-sections, the whiffletree or other draft appliance being connected to the ring $e^3$ to transmit the motion of the draft animal or animals to the harrow.

The rear ends of the outer bars, $a\ b$, of the harrow-sections are extended beyond the corresponding ends of the inner bars, $a'\ b'$, and the said bars $a'\ b'$ are extended at their front ends beyond the corresponding ends of the bars $a\ b$.

The rear ends of the bars of the harrow-sections carry depending cultivator shovels or blades $f$ of any desired or approved pattern, and harrow-teeth $g$ are affixed to the bars of the sections A B, said teeth being arranged in series on the bars of the sections and depending therefrom, as is usual.

The rear ends of the harrow-sections are coupled together by means of a transverse rigid bar, $h$, when the device is adapted for a smoothing-harrow, so that the sections are held from movement or play laterally of each other, and when the harrow is to be used as a cultivating implement for working growing crops, the sections are loosely connected together by an intermediate coupling-link, $c^4$, so that the rear ends of the said sections can be moved or adjusted laterally and independently of each other by the operator to cause the shovels $f$ to perform their office properly. The unyielding bar and open link are interchangeably connected to the harrow-sections in order to convert the implement for smoothing and cultivating purposes.

The inner bars, $a'\ b'$, of the harrow-sections are provided near their rear ends with vertically-disposed open loops or straps $c^3$, which are rigidly secured in place, and through these loops or straps are passed the securing-bolts $c$, that have the usual binding-nuts, $c'$, which bear upon the straps or loops. The ends of the open link $c^4$ are passed through the loops or straps $c^3$, and the securing-bolts $c$ are passed through the coupling-link. The links are capable of endwise or longitudinal movement or play only, and any lateral play thereof on the harrow is prevented by the loops or straps $c^3$, the harrow-sections and the bolts $c$, carried thereby, being capable of movement longitudinally of the link without hinderance from the latter in order to adjust the sections to their proper working positions. The harrow in this condition is capable of use for cultivating purposes, and the rear ends of the sections thereof can be adjusted or moved independently of each other by the operator or attendant, suitable handles, I, being secured to the rear ends of the sections A B, and braced by inclined rods $i$ suitably affixed to the harrow-sections and the handles, as shown.

The rigid coupling-bar $h$ is made considerably longer than the coupling-link $c^4$, and provided in its ends with short longitudinal slots $h'$, through which are passed the bolts $c$, in order to connect the bar to the harrow-sections. The ends of the unyielding coupling-bar $h$ are fitted between the vertical loops or straps $c^3$, and the vertical bolts $c$ pass through the slots in the bar, so that a limited amount of play is permitted the harrow-sections laterally of each other.

The operation of my invention is as follows:
To adapt the device for smoothing purposes, the unyielding slotted bar $h$ is fitted between the vertical straps or loops at the rear end of the harrow, and the bolts $c$ passed through the said bar. The rear ends of the harrow-sections are thus separated a considerable distance, while the front ends are forced together to cause the coupling-arms to assume an inclined position with relation to each other. To convert the device from a smoothing-harrow into a cultivating implement, the vertical bolts $c$ are removed and the bar $h$ detached. The rear ends of the harrow are now drawn together to separate or distend the front ends thereof, and cause the jointed coupling-arms to align with each other, and the open link $c^4$ is then fitted in the straps or loops $c^3$ and the vertical bolts $c$ replaced. The rear ends of the harrow are thus drawn together and loosely coupled so that they can be moved laterally of each other very freely, while the front ends of the harrow are separated and pivotally coupled together. When the harrow is thus loosely coupled together at its rear end, the draft-eyes $e$ are disposed on opposite sides of the central line drawn through the meeting rear ends of the harrow, the pivot-bolt $d$, and the ring $e^3$, so that the draft or strain of the animal is transmitted to the harrow-sections on opposite sides of the line of draft to cause the rear free ends of the sections to normally approach each other. The harrow is thus adapted for a variety of purposes, and the adjustments can be easily and readily performed in a short time.

Having thus fully described my invention, what I claim as new, and desire to secure by Letters Patent, is—

1. The combination of the harrow-sections, the intermediate coupling-arms carried by the sections at one end and jointed together at their meeting ends, the straps or loops carried by the sections at their rear ends, a coupling bar or link intermediate of the rear ends of the harrow-sections and fitted in the straps thereof, and the vertical bolts for detachably connecting the bar or link to the sections, substantially as described.

2. The combination of the harrow-sections loosely coupled together at their rear ends, the jointed arms carried by the sections near their front ends, and the connected draft-links attached to the arms on opposite sides of the line of draft through the harrow, substantially as described, for the purpose set forth.

In testimony that I claim the foregoing as my own I have hereto affixed my signature in presence of two witnesses.

JOHN A. KERN.

Witnesses:
 JOHN W. PATTEN,
 JOHN M. TAYLOR.